April 15, 1952

H. A. STAMPER 2,593,068

STYLUS STRUCTURE FOR RECORDERS

Filed Aug. 2, 1948

INVENTOR
H. A. STAMPER
BY [signature]
ATTORNEY

UNITED STATES PATENT OFFICE 2,593,068

STYLUS STRUCTURE FOR RECORDERS

Hamilton A. Stamper, Los Angeles, Calif., assignor to Bendix Aviation Corporation, South Bend, Ind., a corporation of Delaware Application August 2, 1948, Serial No. 42,052

7 Claims. (Cl. 346—74)

This invention relates to recording instruments in which record marks are made on a paper tape or the like by electrically energizing a stylus that is repeatedly traversed across the tape.

An object of the invention is to simplify and reduce the cost of the mechanism for traversing the stylus across the tape.

Another object is to reduce the power required to traverse the stylus.

Other more specific objects and features of the invention will appear from the description to follow.

Heretofore in recording instruments of this type it has been customary to traverse the stylus across the tape by mounting it upon a rotating arm, moving belt, or the like, that carries the stylus as a whole through a path parallel to the surface of the tape on which the record is to be made. These prior methods have the disadvantage that the stylus-supporting structures have involved mechanisms that were relatively expensive to build and that had considerable weight and friction so that appreciable power was required to drive them, thereby necessitating a more expensive motor, which further increased the cost of the equipment. The use of a rotating arm carrying the stylus through a circular path was further objectionable in that the stylus described an arc across the tape instead of a straight line.

In accordance with the present invention I reduce the initial cost and the power requirements of the apparatus by providing a light rotating drum mounted substantially perpendicular to the paper, with a long, flexible spring wire stylus member secured at one end to the periphery of the drum and adapted to bend around the drum as its tip drags across the tape from one side thereof to the other in response to the drum rotation. By locating the center of the drum adjacent the trailing edge of the tape (with respect to the direction of stylus movement) the stylus winds about the drum throughout the time of traverse of the tape by the tip. In other words, during traverse of the stylus tip across the tape it moves substantially tangent to the drum at a uniform speed equal to the peripheral speed of the drum. After the tip leaves the tape, the stylus unwinds from the drum while the latter is turning through the angle necessary to again bring the tip back to the leading edge of the tape.

Both the stylus and the drum can be of very light construction so that the assembly can be rotated by a relatively small motor.

Referring now to the drawing.

Figures 1, 2, 3, 4, 5, 6:
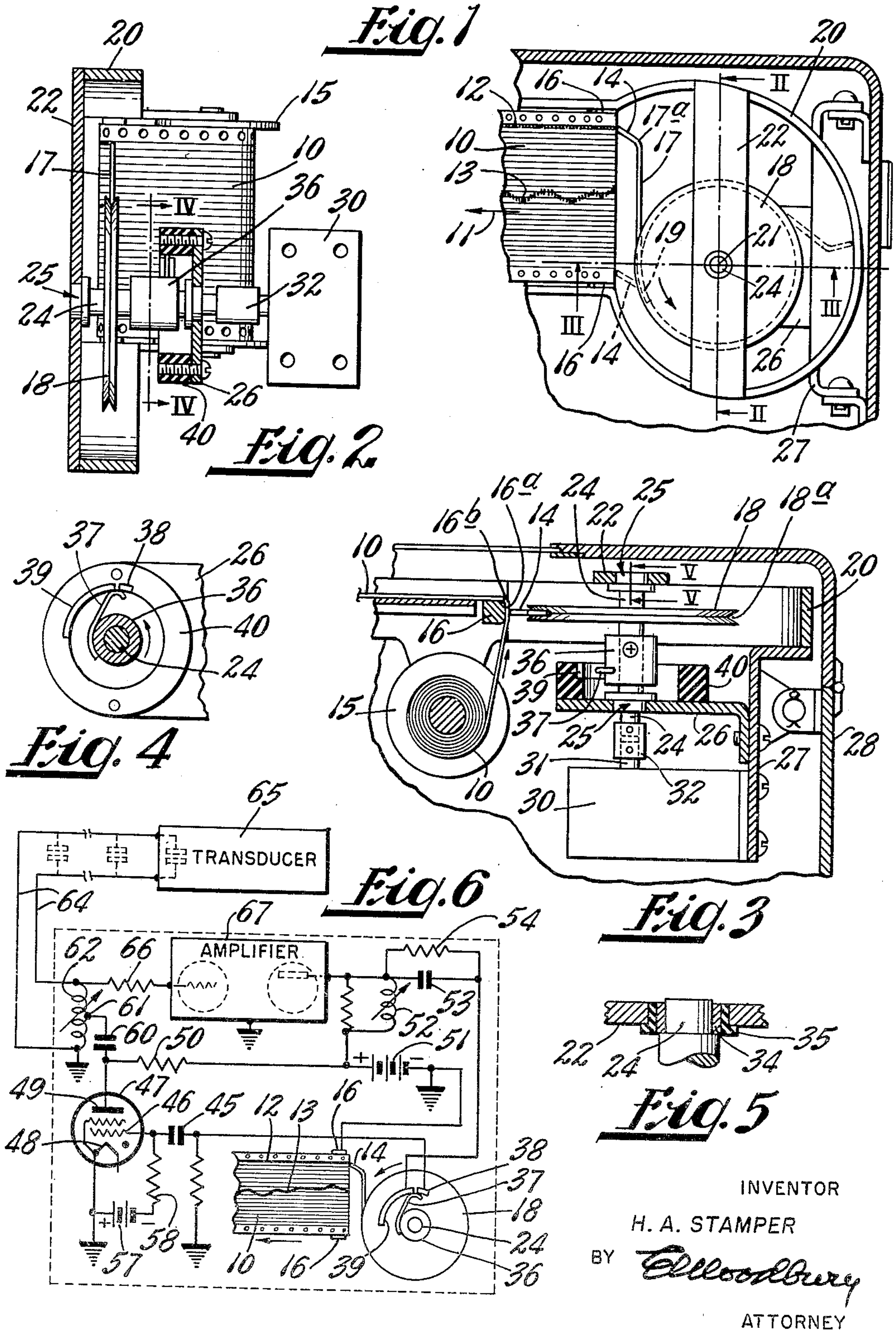
Fig. 1 is a front elevation of a portion of a depth recorder using a stylus mechanism in accordance with the invention, the outer casing being shown in section.
Fig. 2 is a vertical section taken in the plane II—II of Fig. 1.
Fig. 3 is a horizontal section looking up in the plane III—III of Fig. 1.
Fig. 4 is a detail vertical section taken in the plane IV—IV of Fig. 2.
Fig. 5 is a detail vertical section taken in the plane V—V of Fig. 3.
Fig. 6 is a schematic diagram of a depth recording circuit with which the present recorder can be employed.

Referring first to Fig. 1, there is shown a record blank consisting of a paper tape 10 which, during operation of the recorder, is moved slowly to the left, as indicated by the arrow 11. This record tape 10 is adapted to be used in depth recording and is shown as having recorded thereon a base line 12 and a depth line 13. Each of these lines 12 and 13 consists really of a plurality of short, vertical increments positioned so close together as to form substantially continuous record lines. These increments are successively recorded by a stylus 14 which is repeatedly dragged across the tape 10 from top to bottom and has applied thereto electrical impulses, the timing of which determines the vertical positions of the increments on the tape. The present invention resides in the structure for moving the stylus 14 across the tape 10.

The tape 10 may be supported in various ways but, as best shown in Figs. 1 and 3, it may be pulled off a spool 15 and around a backing bar 16 having a flat face 16a that supports the tape 10 in the path of movement of the stylus 14. The movement of the tape carries it around the corner 16b of the backing bar, where it becomes visible through a window (not shown) in the front of the instrument case, as indicated in Fig. 1. The tape 10 may be continuously drawn through the path described by a wind-up spool that does not appear in the drawing. Any suitable wind-up structure can be employed and does not constitute a part of the present invention.

The stylus 14 is constituted by one end of a spring wire stylus member 17, the other end of which is secured to the periphery of a rotary stylus carrier consisting of a drum 18, as indicated at 19. Fig. 1 shows the stylus member 17 with the stylus 14 positioned near the upper edge of the record tape 10, under which condition it will be noted that the drum 18 is so spaced from the bar 16 that the main portion of the stylus member 17 extends substantially parallel to the bar 16 and tangent to the drum 18. This tangency is made possible by providing a bend 17a in the stylus member adjacent the stylus 14. As the drum 18 rotates in counter-clockwise direction (with reference to Fig. 1) the stylus 14 is moved downwardly across the tape 10 at substantially uniform speed, because the stylus member 17 winds onto the drum 18 during this portion of the cycle. When the stylus 14 has reached the bottom of the tape 10, as indicated by the dotted lines shown in Fig. 1, the normally straight portion of the stylus member 17 is substantially completely bent around the drum 18. To guide the stylus member during its bending or wrapping movement about the drum, the latter may have a V-shaped groove 18a in its periphery, as shown in Fig. 3.

To restore the stylus member 17 to extended relation with respect to the drum 18 at the beginning of each movement across the tape 10, a guide 20 is provided which extends from the lower edge of the tape 10, in approximately a spiral path about the axis 21 of the drum 18, to the upper edge of the record tape 10. This permits the stylus 14 to gradually move outwardly from the drum from the time it leaves the bottom of the record tape until it returns to the top hereof. At the same time, it controls the outward movement of the stylus member, preventing free oscillations thereof such as would occur if no control over its movement were provided when not in contact with the tape. The stylus guide 20 may be connected at its opposite ends to the bar 16, and be extended beyond the bar 16 to constitute a portion of the framework for other parts of the instrument. A vertical frame member 22 is connected at its ends to the guide member 20 and constitutes a support for a bearing structure 25 at one end of the shaft 24. The other end of the shaft 24 may be supported by a similar bearing structure 25 in a plate 26 which is secured to a frame member 27, the latter being connected to the case 28 of the instrument and also to the peripheral guide member 20 for supporting the latter. The frame member 27 also supports a motor 30, the shaft 31 of which is coaxial with the shaft 24 and is connected thereto by an insulating coupling 32.

As previously indicated, the lines 12 and 13 are formed on the record tape 10 by an electrical discharge from the stylus 14, and therefore the stylus 14, drum 18 and its shaft 24 are insulated from the frame of the instrument by insulating the bearings that support the shaft. Thus, referring to Fig. 5, the front end of the shaft 24 is supported in a bearing bushing 34, which in turn is contained within an insulating bushing 35 that is mounted in an aperture provided therefor in the frame member 22. The other bearing assembly in the plate 26 is of similar construction.

To apply the electrical impulses to the stylus member 17, the shaft 24 is provided with a hub 36 that carries a brush 37, which is adapted to sweep over a pair of conductive segments 38 and 39 which are supported in an insulating ring 40 concentrically positioned about the shaft 24. The arrangement is such that at the instant the brush 37 passes from segment 38 to segment 39, it momentarily connects the segments, causing the transmission of sonic waves (in the case of a depth recorder) and applying an impulse to the brush 37 and thence to the stylus 14 which produces the marking increments which form the base line 12. While the stylus 14 is traversing the record tape 10, the brush 37 is traversing the long segment 39, and if an echo of the transmitted sonic wave is received during this time, an impulse in response thereto is applied from the segment 39 to the brush 37 and thence to the stylus 14 to produce an increment of the depth line 13.

A circuit that can be employed with the present equipment for use in depth recording is shown in Fig. 6. Thus it will be observed that the short segment 38 is connected through a condenser 45 to the control grid 46 of a tube 47, the cathode 48 of which is connected to ground, and the anode 49 of which is connected through a resistor 50 to the positive terminal of a B battery 51, the negative terminal of which is grounded. The backing bar 16 around which the record tape moves is also connected to ground. At the instant that the brush 37 contacts both the segments 38 and 39, it applies a positive potential from a condenser 53 through the segment 39 to the brush 37, and through the shaft 24 and the drum 18 to the stylus 14, producing a discharge from the stylus through the paper to the bar 16 to produce an increment in the base line 12. Both plates of the condenser 53 were previously at the potential of the B battery 51, the positive terminal of which is connected through a reactance element 52 and a high resistance leak 54 to the segment 39. The condenser 53 is charged by contact of the brush 37 with the segments 38 and 39, since normally the high resistance 54 bridging the condenser maintains it in discharged condition.

The potential applied from the condenser 53 through the condenser 45 to the control grid 46 of the tube 47 causes that tube to become conductive (it being normally rendered non-conductive by the negative potential of a biasing battery 57 which is connected to the grid through a grid leak 58.) When the tube 47 becomes conductive, a condenser 60 connected between the anode 49 of the tube and a tap 61 on an inductance element 62 is suddenly discharged through the lower portion of the inductance element 62 to ground, the current shocking an oscillatory circuit constituted by the inductance 62 and the distributed capacity of a transmission line 64 which connects the inductance 62 to a transducer 65. The resultant oscillations energize the transducer, causing it to transmit sonic waves of corresponding frequency. When an echo from the transmitted sonic waves is received by the transducer 65, it produces corresponding electric waves which are applied through the transmission line 64 and a resistance element 66 to the input end of an amplifier 67, the output end of which is connected by the condenser 53 to the segment 39 and thence to the stylus 14, and through the tape 10 to the bar 16, producing another increment in the depth line 13.

It is to be understood that the circuit of Fig. 6 is only one of many that can be used with the recording apparatus described, and does not constitute a part of the present invention.

Although for the purpose of explaining the invention, a particular embodiment thereof has been shown and described, obvious modifications will occur to a person skilled in the art, and I do not desire to be limited to the exact details shown and described.

I claim:

1. Apparatus of the type described comprising: means for supporting and moving a sheet record in transversely flat shape through a fixed record path past a fixed straight scanning path extending transversely across said record path; a scanning mechanism positioned entirely on the front side of said record path and including a stylus carrier and an elongated resilient stylus member attached at one end to said carrier and having a free scanning end; means rotatably supporting said carrier for continuous rotation about a fixed axis, and means for rotating it; said resilient stylus member when unrestrained extending from its point of attachment to said carrier in a direction having a radial component away from said axis and describing a circular path; and means for bending said resilient stylus member to deflect said scanning end thereof from movement through its normal circular path into linear movement through said scanning path during a portion of each revolution of said stylus carrier.

2. Apparatus according to claim 1 in which said axis of said carrier lies in a plane substantially normal to and intersecting said scanning path at the trailing end thereof, whereby said stylus member is increasingly bent during traverse of said scanning path by said free end.

3. Apparatus according to claim 2 in which said carrier has an outwardly facing curved peripheral surface extending rearwardly from the point of attachment of the stylus member to the carrier for the stylus member to bend around during traverse of the scanning path by said free end.

4. Apparatus according to claim 3 in which said carrier is so spaced from said scanning path that during movement of said stylus end through said scanning path, the free portion of said stylus member between the free end thereof and said peripheral portion of the carrier is substantially parallel to said scanning path.

5. Apparatus according to claim 1 including endless guide means at least approximately in the plane of rotation of said stylus member for engaging and guiding said stylus adjacent its free end during each revolution thereof, said guide means including as a portion thereof said means for bending said stylus member into linear movement through said scanning path.

6. Apparatus according to claim 5 in which said guide means comprises a closed track of generally expanding radius, with respect to said axis of rotation, from the trailing end of said scanning path to the head end thereof.

7. Apparatus according to claim 1 in which said means for supporting and moving said sheet record comprises a backing member having two angularly disposed record-contacting surfaces meeting at a corner parallel to said scanning path around which said record is adapted to be moved, said scanning path extending across the record-contacting surface just ahead of said corner, whereby movement of said record past said corner exposes it to view unobstructed by said scanning mechanism.

HAMILTON A. STAMPER.

REFERENCES CITED

The following references are of record in the file of this patent:

UNITED STATES PATENTS

| Number | Name | Date |
|---|---|---|
| 2,127,331 | Fulton | Aug. 16, 1938 |
| 2,209,720 | Rustad | July 30, 1940 |
| 2,278,919 | Erickson et al. | Apr. 7, 1942 |
| 2,437,242 | Cole et al. | Mar. 9, 1948 |